United States Patent
Marten et al.

(10) Patent No.: US 6,368,250 B1
(45) Date of Patent: Apr. 9, 2002

(54) METHOD AND REGULATING AND CONTROL UNIT FOR INFLUENCING THE MOVEMENT DYNAMICS OF A MOTOR VEHICLE

(75) Inventors: Andreas Marten, Ostfildern; Hans-Peter Jaeger, Malmsheim; Hans-Joachim Volkmann, Stuttgart, all of (DE)

(73) Assignee: Micro Compact Car smart GmbH, Renningen (DE)

(*) Notice: Subject to any disclaimer, the term of this patent is extended or adjusted under 35 U.S.C. 154(b) by 0 days.

(21) Appl. No.: 09/508,395

(22) PCT Filed: Jul. 8, 1999

(86) PCT No.: PCT/EP99/04806

§ 371 Date: Jun. 30, 2000

§ 102(e) Date: Jun. 30, 2000

(87) PCT Pub. No.: WO00/02754

PCT Pub. Date: Jan. 20, 2000

(30) Foreign Application Priority Data

Jul. 11, 1998 (DE) .......................................... 198 31 249

(51) Int. Cl.[7] ........................... A60K 41/02; F16D 23/10
(52) U.S. Cl. .................... 477/175; 477/904; 192/103 C
(58) Field of Search ................................ 477/174, 175, 477/181, 186, 904; 192/103 C, 103 R

(56) References Cited

U.S. PATENT DOCUMENTS

| | | | | |
|---|---|---|---|---|
| 4,679,145 A | * | 7/1987 | Beeck et al. ............ 477/120 X |
| 5,079,708 A | * | 1/1992 | Brown ................... 364/424.05 |
| 5,319,555 A | * | 6/1994 | Iwaki et al. ............. 477/904 X |
| 5,332,059 A | * | 7/1994 | Shirakawa et al. ......... 180/197 |
| 5,439,425 A | * | 8/1995 | Ramm et al. ............ 477/175 X |
| 5,566,072 A | * | 10/1996 | Momose et al. ............ 364/436 |
| 5,737,714 A | * | 4/1998 | Matsuno et al. .............. 701/89 |
| 5,826,209 A | * | 10/1998 | Matsuno ....................... 701/69 |
| 6,029,511 A | * | 2/2000 | Welsch et al. ............ 701/69 X |
| 6,186,925 B1 | * | 2/2001 | Bellinger ................. 192/103 C |
| 6,199,001 B1 | * | 3/2001 | Ohta et al. ...................... 701/51 |

FOREIGN PATENT DOCUMENTS

| | | | |
|---|---|---|---|
| DE | 3935588 A1 | 4/1991 | |
| DE | 19827117 A1 | 12/1999 | |
| EP | 0829401 A2 | 8/1997 | |
| FR | 2 591 957 | 6/1987 | |
| GB | 2163511 A | 7/1985 | |
| JP | 359041639 | * 3/1984 | ................. 477/904 |
| JP | 402278074 | * 11/1990 | ................. 477/904 |
| JP | 406081935 | * 3/1994 | ................. 477/904 |

* cited by examiner

Primary Examiner—Charles A Marmor
Assistant Examiner—Roger Pang
(74) Attorney, Agent, or Firm—Crowell & Moring LLP

(57) ABSTRACT

A method for influencing the driving dynamics of a motor vehicle wherein the vehicle speed and the transverse acceleration are feed as input signals to a regulating and control unit in which an actuation signal is produced when a limiting value of a variable which determines the driving condition is exceeded. When a limiting value of the vehicle speed and/or the transverse acceleration is exceeded, throttle-valve actuating signals for limiting the throttle-valve position are provided and when a determined change in the transverse acceleration over time exceeds a limiting value, a clutch actuating signal is produced for opening the clutch.

16 Claims, 1 Drawing Sheet

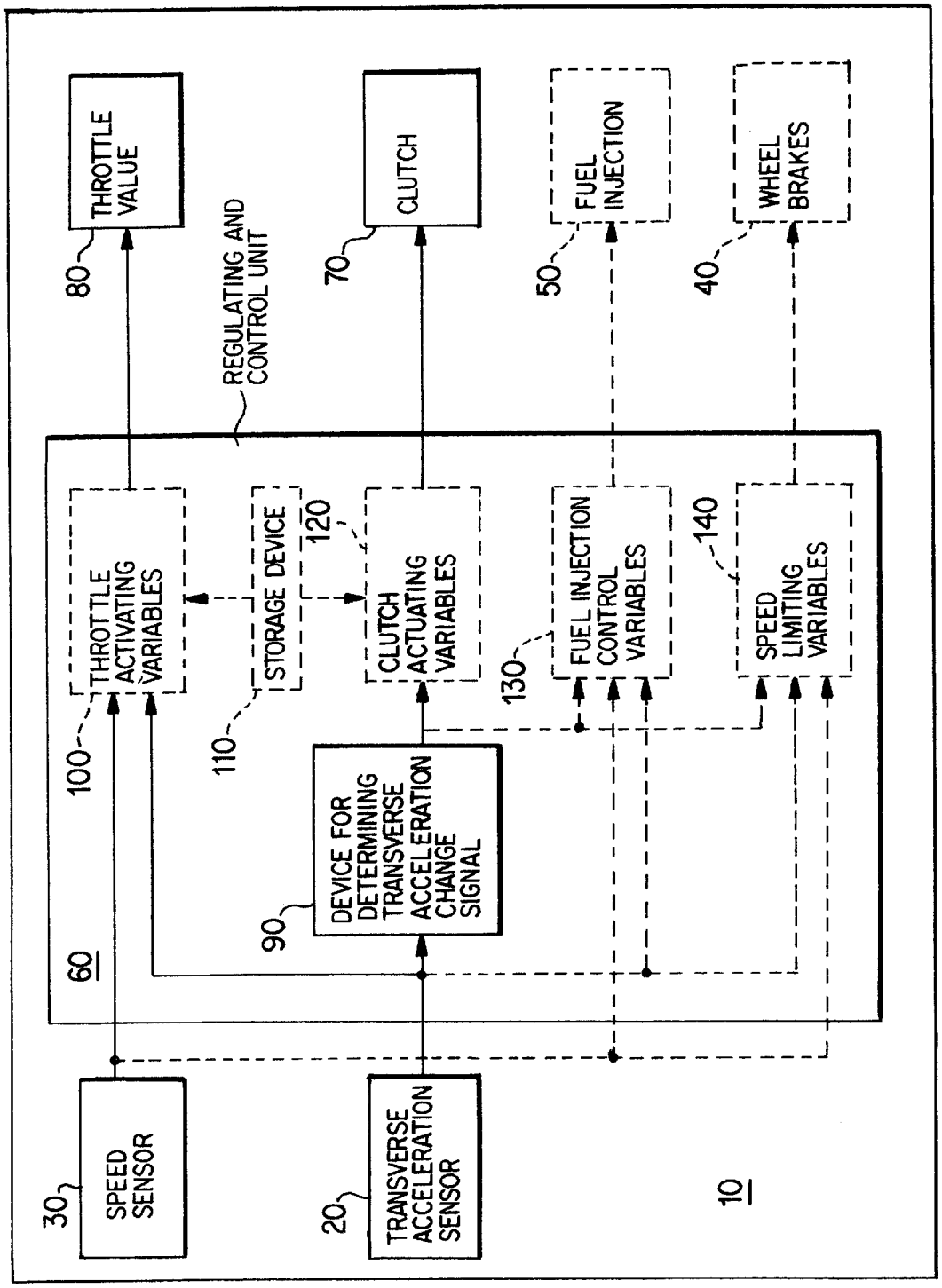

METHOD AND REGULATING AND CONTROL UNIT FOR INFLUENCING THE MOVEMENT DYNAMICS OF A MOTOR VEHICLE

BACKGROUND AND SUMMARY OF THE INVENTION

This application claims the priority of German Application No. 19831249.0, filed Jul. 11, 1998, the disclosure of which is expressly incorporated by reference herein.

The invention relates to a method and to a regulating and control unit for influencing the driving dynamics of a motor vehicle.

Printed publication DE-Z: ATZ 96 (1994) 11, pages 657 ff. gives a description of an electronic driving-dynamics regulating system by means of which active interventions into individual vehicle components are performed to improve dynamic driving behaviour. To provide input signals for the regulating system, the vehicle speed and the transverse acceleration are measured and are used together with further input variables, such as the steering-wheel angle, to determine a desired curve for the yaw rate. The deviation of the actual driving behaviour from the desired driving behaviour is determined by means of a comparison with the current actual yaw rate and used to determine a regulating intervention. As oversteer begins, the driving torque is reduced, for example, in order to increase the cornering potential of the wheels of the driven axle.

Another driving-dynamics regulating system is known from EP 05 54 892 A1. This printed publication discloses a system for traction control in motor vehicles with automatic transmission, using the shift state of the transmission and the vehicle speed as input signals and producing from these an actuating signal for adjusting the throttle-valve position to enable the driving torque to be adjusted.

German printed publication DE 35 45 716 A1, discloses a device for propulsion regulation on motor vehicles of which the intention is to prevents spinning of the driven vehicle wheels in cases where the slip of a wheel exceeds a threshold value. Additional conditions taken into account are the vehicle speed and the transverse acceleration, which are each checked to determine whether they exceed a limiting value. In this case, a limiting regulating intervention is performed on the throttle valve.

German Publication DE 36 12 170 A1 has furthermore disclosed using the change in the transverse acceleration over time as a control signal for reducing the output torque of the drive unit of a vehicle. Here, an actuator designed as an electronic engine output controller is activated to reduce the driving power.

German printed publication DE 37 41 009 A1 discloses a control apparatus for distributing the driving power of a vehicle with all-wheel drive, by means of a transmission clutch which can continuously vary a torque transmitted to the front axle. As the difference in wheel speed increases, there is an increase in the torque transmitted to the front axle with a steep rate of rise if the transverse acceleration is low and with a low rate of rise if the transverse acceleration is high. However, this control apparatus is intended exclusively for distributing driving torque between a front axle and a rear axle and cannot be used for vehicles with two-wheel drive.

One object of the invention is to provide a driving-dynamics system which provides additional adjustment facilities for influencing the driving dynamics of a motor vehicle.

Another object of the invention is to increase the stability of the vehicle.

Still another object of the invention is to provide a driving-dynamics system which is designed to be as simple a design as possible, and to use existing resources as far as possible.

These and other objects and advantages are achieved by the control method and apparatus according to the present invention, in which the vehicle's longitudinal speed and the transverse acceleration are sensed and used to determine an actuating signal for the throttle-valve position and for the clutch. If either of the vehicle speed or the transverse acceleration exceeds a limiting value, the maximum opening angle of the throttle valve is limited, thereby also limiting the engine output. A maximum vehicle speed will then also be established, at least with given constant external circumstances. The method according to the invention has the advantage that, below the limiting value for the vehicle speed and/or the transverse acceleration, the throttle-valve position is determined solely by the demand made by the driver; whereas, above the limiting value, it is limited to a maximum opening angle. The output torque at the driven axle is thereby limited or reduced, if appropriate to the maximum drag torque of the engine. Limiting or reducing the driving torque means that the longitudinal forces acting on the driven vehicle wheels are smaller and the vehicle wheels are thus able to accept higher cornering forces, thereby increasing the stability of the vehicle.

This strategy exploits the system characteristics of a motor vehicle based on a drive-by-wire concept. Compared with known regulation concepts, the only additional hardware component is a sensor for measuring transverse acceleration no further vehicle components are necessary. The gain in stability is achieved with minimal additional expenditure on hardware.

Another advantage is that wheel braking is, initially, not necessary, thus eliminating the need to transmit via the wheels any additional longitudinal forces, which would limit the transmission of additional, stabilizing cornering forces.

As a further stabilizing intervention, the clutch discs can be separated, thus interrupting torque transmission in the drive line and freeing the driven axle or driven wheels completely from as driving torques and hence from longitudinal forces, thereby allowing maximum cornering forces to be transmitted.

Torque transmission is generally interrupted in extreme driving situations, which occur when the transverse acceleration has a steep gradient or a large change over time. The change in the transverse acceleration over time is compared with a limiting value; if the change in the transverse acceleration exceeds the limiting value, the clutch is opened.

BRIEF DESCRIPTION OF THE DRAWING

The sole FIGURE is a schematic illustration of the regulating and control system.

DETAILED DESCRIPTION OF THE INVENTION

A vehicle 10 includes the regulating and control unit 60. Inputs to the regulating and control unit include the output of the transverse acceleration sensor 20 and the speed sensor 30. Although illustrated as a speed sensor, the vehicle speed can also be derived from the wheel rotational speeds. Limitation of the vehicle speed occurs through the activation of the wheel brakes 40 in order to provide stability. The limitation of the operations of the fuel injection 50 is also a part of the stabilization of the vehicle. The output of the regulation and control unit 60 includes a characteristic map of throttle actuating variables to control the throttle valve 80. The map of clutch actuating variables is used to control the clutch 70 and the fuel injection control variables mapped at 130 are used to control the fuel injection 50. Lastly, the speed limiting variables at 140 are used to limit the vehicle speed through the wheel brakes 40 and for canceling any limitation on the vehicle speed. These variables may include transverse acceleration, change in transverse acceleration over time, and vehicle speed. Limiting values for each of the vehicle speed, transverse acceleration and the change in transverse acceleration are stored in the storage device 110 show as positioned between the throttle actuation variables and the clutch actuation variables. The above mentioned change in transverse acceleration signal is determined by device 90 which receives the output of the transverse acceleration sensor 20 and outputs signals to each of the clutch, fuel injection and speed limiting variable characteristic maps 120, 130 and 140.

Throttle-valve adjustment and separation of the clutch discs represent different possibilities of intervention which can be combined in a common regulating and control unit but are based on different physical variables and limiting values. Throttle-valve adjustment is performed as a function of vehicle speed and transverse acceleration, while the clutch intervention is performed as a function of the change in the transverse acceleration over time. It is thereby possible to achieve a graduated stabilization strategy by initially reducing the driving torque by way of the throttle-valve intervention in the case of the customary driving maneuverer and driving situations as a rule and separating the clutch discs in an additional step—in in dangerous driving situations.

The two interventions do not have to take place in succession but can be employed according to the situation. It may be that large changes in transverse acceleration, caused, for example, by powerful steering movements, occur suddenly at low vehicle speeds and small transverse accelerations, in which case the only action taken to build up the cornering forces required for stability is to separate the clutch discs and there is no need to change the position of the throttle valve at the same time. This takes account of the fact that a dangerous situation which arises suddenly requires a quick-acting intervention to stabilize the vehicle. As a direct intervention in the drive line, separation of the clutch discs takes effect more rapidly than limiting the maximum opening angle of the throttle valve since the change in the throttle-valve position makes itself felt only after a delay, by way of the combustion of the fuel/air mixture introduced, and furthermore relieves the driven axle only partially of load, rather than completely, because, even with the throttle valve closed, the drag torque of the engine is at least transmitted. If the clutch discs are closed again, the throttle valve is still in the position corresponding to the demand made by the driver or the position limited to the maximum value, thereby avoiding inertia-related delays in response.

Conversely, it is not absolutely essential, even at high speeds, and with large transverse accelerations, to divide the drive line. It is generally sufficient to specify a maximum throttle-valve position.

It may, however, be appropriate to perform both measures simultaneously, i.e. both to limit the throttle-valve position and to separate the clutch discs.

The vehicle speed and the transverse acceleration are detected at discrete time intervals by sensor means and, in particular, the vehicle speed is determined from wheel rotational speed.

The limiting values for the vehicle speed and the transverse acceleration and for the change in transverse acceleration can be adapted to the specific vehicle and stored in a storage unit of the regulating and control unit. It is expedient if the throttle-valve positions are stored in a characteristic map of the regulating and control unit as a function of vehicle speed and transverse acceleration, thus allowing each current value of a vehicle speed and a transverse acceleration to be assigned a maximum throttle-valve position.

To prevent a load-change reaction due to a rapid change in driving torque from being triggered by the change in the throttle-valve position, it is advantageous to specify a limiting value for the maximum possible change in the throttle-valve position over time and, consequently, a gradient for the movement of the throttle valve, to which value every change of the throttle valve is limited. Below the limiting value, no limitation of the change of the throttle valve is performed. Limitation of the change of the throttle valve has an advantageous effect particularly when there is a change in the vehicle speed or the transverse acceleration because such a change generally triggers a change in the limiting value of the throttle-valve position as well. If the demand made by the driver exceeds the highest limiting value, the throttle valve will always tend to assume the maximum possible opening angle. The movement between two possible positions of the throttle valve—both an increase and a reduction—is limited by the limiting value of the change of the throttle valve, which limits load-change reactions to a reasonable level.

If the demand made by the driver is below the throttle-valve limiting value currently applicable to a particular speed and to a particular transverse acceleration or if the demand falls below this limiting value due to changes in external conditions, it is expedient if the throttle-valve limitations do not take effect but, instead, the demand made by the driver is converted without limitation into a desired throttle-valve position. The clutch discs are also closed again as soon as the current value of the change in transverse acceleration falls below the corresponding limiting value.

The current value of the change in transverse acceleration is preferably determined as a difference quotient by dividing the difference between successive measured values of transverse accelerations by the time period between the measured values. This simple method provides reliable results, particularly in the case of small time intervals between successive measurements.

Additional possibilities of intervention to stabilize the vehicle are provided by limiting fuel injection and by activating the wheel brake. By controlling fuel injection it is possible to influence the driving torque, whereas adjusting the wheel brake directly determines the level of the braking torque.

Fuel injection is expediently suspended if the vehicle speed exceeds a limiting value, it being possible for this limiting value to be identical with the vehicle-speed limiting value which determines the throttle-valve position, but it can also differ from it and, in particular, be higher than it.

As an additional criterion for the suspension of fuel injection, it is possible to use the transverse acceleration or the change in transverse acceleration, it being expedient to use just one of these criteria, though in combination with the abovementioned vehicle-speed criterion. The limiting values for the transverse acceleration or change in transverse acceleration can again be identical with the limiting values used for the throttle-valve and the clutch intervention, but may also differ from these and, in particular, be higher.

Fuel injection is preferably resumed as soon as the transverse acceleration and the change in transverse acceleration over time each undershoot an associated limiting value, and in this case too it is possible for the limiting values to be identical with the limiting values at which injection is suspended, but they can also differ and, in particular, be lower.

As a stabilizing measure, it is possible to limit the vehicle speed directly, in particular by activating the wheel brake. This can take place in the presence of various criteria, which must be met either singly or cumulatively, depending on the design. Criteria that can be employed are whether the vehicle speed has reached a limiting value, whether the vehicle acceleration has reached a limiting value and/or whether the change in transverse acceleration has reached a limiting value, it being possible for the respective limiting values to be identical with or different from the corresponding limiting values for the throttle-valve intervention, the clutch intervention or the intervention into the fuel injection.

The activation of the wheel brake is preferably cancelled again if the transverse acceleration and the change in transverse acceleration over time each undershoot an associated limiting value, and in this case too, these limiting values can differ from the above limiting values and, in particular, be lower.

Sensors are provided for measuring the vehicle speed and the transverse acceleration, although it is also possible for the vehicle speed to be determined by measuring the wheel rotational speeds. The measurement signals are fed as input signals to the regulating and control unit, in which the maximum permissible throttle-valve position is determined from a characteristic map as a function of the input signals and fed as an actuating signal to an actuating device for adjusting the throttle valve. The change in transverse acceleration is furthermore determined in the regulating and control unit from at least two successive signals for the transverse acceleration and is compared with a stored limiting value, and a clutch-actuating signal is produced if the limiting value is reached or exceeded. The clutch-actuating signal is fed to an actuating device by means of which the clutch discs are separated to interrupt the drive line.

It is also possible to use a calculation rule to determine the maximum permissible throttle-valve position instead of a characteristic map.

The method and the regulating and control unit are intended for use in vehicles with manual transmissions. However, use in automatic transmissions is also a possibility, and in this case the adjacent discs of the torque converter are separated to interrupt torque transmission in the drive line.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for influencing the driving dynamics of a motor vehicle, the vehicle speed and the transverse acceleration being fed as inputs signals to a regulating and control unit in which throttle valve actuating signals for the purpose of limiting the throttle-valve position are produced when a limiting value of one of the vehicle speed and the transverse acceleration is exceeded, said method comprising the acts of:

determining a change in said transverse acceleration signal over time and providing a transverse acceleration change signal;

providing a clutch-actuating signal for opening a clutch of said motor vehicle when said transverse acceleration change signal exceeds said limiting value.

2. Method according to claim 1, wherein the change in the transverse acceleration over time is determined as the difference quotient of successive measurements of transverse accelerations.

3. Method according to claim 1, wherein the clutch is closed again as soon as the change in the transverse acceleration over time undershoots the corresponding limiting value again.

4. Method according to claim 1, wherein the limitation of the throttle-valve position is cancelled again as soon as the vehicle speed and/or the transverse acceleration undershoot the corresponding limiting value again.

5. Method according to claim 1, wherein a characteristic map for the throttle-valve position is specified as a function of the vehicle speed and the transverse acceleration and, in the characteristic map, each current value of a vehicle speed and a transverse acceleration is assigned a maximum throttle-valve position.

6. Method according to claim 1, wherein a limiting value for the maximum possible change in the throttle-valve position over time is specified.

7. Method according to claim 1, wherein fuel injection is suspended if the vehicle speed exceeds a limiting value.

8. Method according to claim 1, wherein fuel injection is suspended if the transverse acceleration exceeds a limiting value.

9. Method according to claim 1, wherein fuel injection is suspended if the change in the transverse acceleration over time exceeds a limiting value.

10. Method according to claim 1, wherein the vehicle speed is limited when a limiting value is reached.

11. Method according to claim 1, wherein the vehicle speed is limited if the transverse acceleration exceeds a limiting value.

12. Method according to claim 1, wherein the vehicle speed is limited if the change in the transverse acceleration over time exceeds a limiting value.

13. Method according to claim 10, wherein the vehicle speed is limited by means of a wheel brake.

14. Method according to claim 10, wherein the limitation of the vehicle speed is cancelled again as soon as the transverse acceleration and the change in the transverse acceleration over time undershoot a limiting value.

15. Method according to claim 9, wherein fuel injection resumes as soon as the transverse acceleration and the change in the transverse acceleration over time undershoot a limiting value.

16. A regulating and control unit for influencing the driving dynamics of a motor vehicle by measuring the vehicle speed and the transverse acceleration of the motor vehicle, said control unit measuring said vehicle speed and said transverse acceleration by means of inputs from sensors whereby when a limiting value of at least one of said vehicle speed and said transverse acceleration is exceeded, a throttle-valve actuating signal is produced and fed to an actuating device for the throttle-valve to limit throttle-valve position and wherein a clutch-actuating signal for opening the clutch is produced if the transverse acceleration signal changes over time by a value exceeding a predetermined value.

* * * * *